US012650412B2

(12) United States Patent
Lee et al.

(10) Patent No.: US 12,650,412 B2
(45) Date of Patent: Jun. 9, 2026

(54) CHARACTERIZATION OF ELASTIC MODULUS OF TUBULAR MATTER

(71) Applicant: Toyota Motor Engineering & Manufacturing North America, Inc., Plano, TX (US)

(72) Inventors: Taehwa Lee, Ann Arbor, MI (US); Xiaopeng Li, Ann Arbor, MI (US); Ziqi Yu, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 623 days.

(21) Appl. No.: 18/164,409

(22) Filed: Feb. 3, 2023

(65) Prior Publication Data

US 2024/0264125 A1 Aug. 8, 2024

(51) Int. Cl.
*G01N 29/44* (2006.01)
*G01N 29/12* (2006.01)
*G01N 29/28* (2006.01)
*G01N 29/34* (2006.01)

(52) U.S. Cl.
CPC .......... *G01N 29/449* (2013.01); *G01N 29/12* (2013.01); *G01N 29/28* (2013.01); *G01N 29/34* (2013.01); *G01N 2291/02818* (2013.01); *G01N 2291/103* (2013.01); *G01N 2291/2636* (2013.01)

(58) Field of Classification Search
CPC .............. G01M 5/0025; G01M 5/0066; G01N 2203/0075; G01N 2291/02827
See application file for complete search history.

(56) References Cited

U.S. PATENT DOCUMENTS

| | | | |
|---|---|---|---|
| 4,899,588 A | 2/1990 | Titlow et al. | |
| 4,935,884 A | 6/1990 | Hajicek | |
| 5,115,673 A | 5/1992 | Kline et al. | |
| 7,426,865 B2 | 9/2008 | Reed | |
| 11,754,544 B2 * | 9/2023 | Perrier | G01N 29/045 |
| | | | 73/64.53 |
| 2012/0227499 A1 * | 9/2012 | Amir | G01N 29/043 |
| | | | 73/622 |
| 2019/0011405 A1 * | 1/2019 | Cox | G01N 29/4436 |
| 2020/0386716 A1 * | 12/2020 | Yang | G01N 29/09 |
| 2022/0276213 A1 * | 9/2022 | Perrier | G01N 33/18 |

FOREIGN PATENT DOCUMENTS

KR 102179707 B1 * 11/2020 ............. H04R 1/028

OTHER PUBLICATIONS

English Translation of KR-102179707-B1 (Year: 2020).*
Koruk, H. "An assessment on the performance of impedance tube method", Noise Control Engineering Journal 62 (4), 264-274, 2014. http://dx.doi.org/10.3397/1/376226.

* cited by examiner

*Primary Examiner* — Alexander A Mercado
(74) *Attorney, Agent, or Firm* — Jordan IP Law, LLC

(57) ABSTRACT

Systems, apparatuses, and methods provide for measuring elastic modulus usable with a tubular object. A sound signal is propagated within the tubular object via a speaker coupled to a proximal end of an impedance tube. The propagated sound signal is measured within the tubular object via a pair of microphones coupled to the impedance tube. An elastic modulus of the tubular object is determined in response to the measurement of the propagated sound signal.

19 Claims, 7 Drawing Sheets

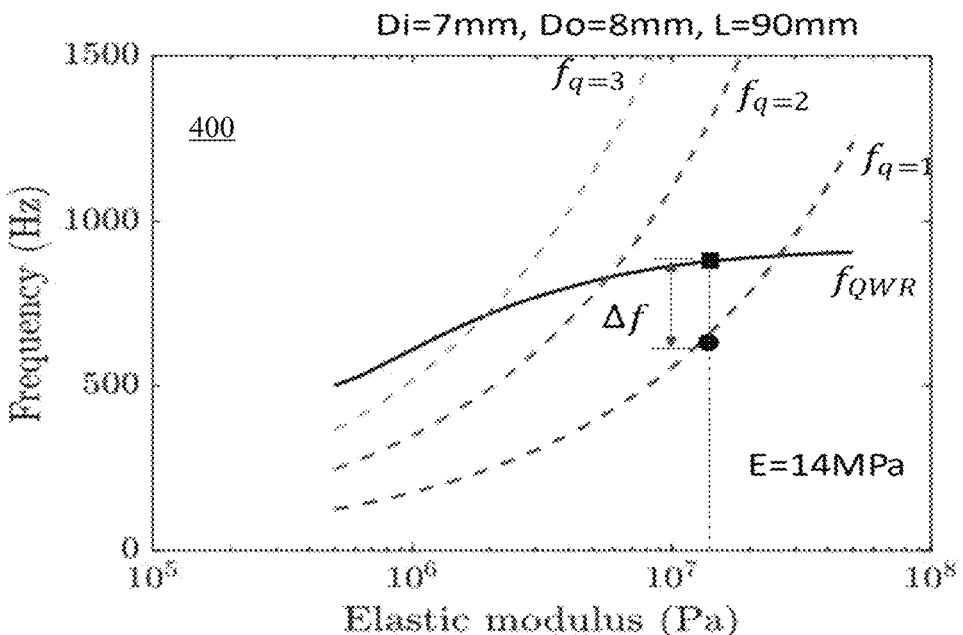

For quarter wavelength resonance (QWR), $f_{QWR}$                                                     402

$$f_{QWR} = \frac{c}{L + 0.6r} \sqrt{\frac{K_w}{K_w + \rho_f c^2}},$$

Where $K_w = \frac{Et}{D_i}$, $r = \frac{D_i + D_o}{2}$ is the median radius, and $t = \frac{D_o - D_i}{2}$ is the thickness.

For structural resonance (mode, q), $f_q$ $$f_q = \frac{1}{4\pi}\omega_a \left( K_2 - \sqrt{K_2^2 - 4K_0} \right),$$

With $$K_0 = (1 - v^2)\left(\frac{q\pi r}{L}\right)^2 + \beta \left(\frac{q\pi r}{L}\right)^6,$$

$$K_2 = 1 + \left(\frac{q\pi r}{L}\right)^2 + \beta \left(\frac{q\pi r}{L}\right)^4,$$

$$\omega_a = \frac{1}{r}\sqrt{\frac{E}{\rho(1 - v^2)}}, \text{ and}$$

404                                    $$\beta = \frac{t^2}{12r^2}$$

| parameters | |
|---|---|
| $c$ | Sound speed |
| $E$ | Elastic modulus |
| $\rho_f$ | Air mass density |
| $L$ | Tube length |
| $r$ | Median radius of tube |
| $t$ | Tube thickness |
| $D_i$ | Tube inner diameter |
| $D_o$ | Tube outer diameter |
| $\rho$ | Tube's mass density |
| $v$ | Tube's Poisson ratio |

Figure 5:
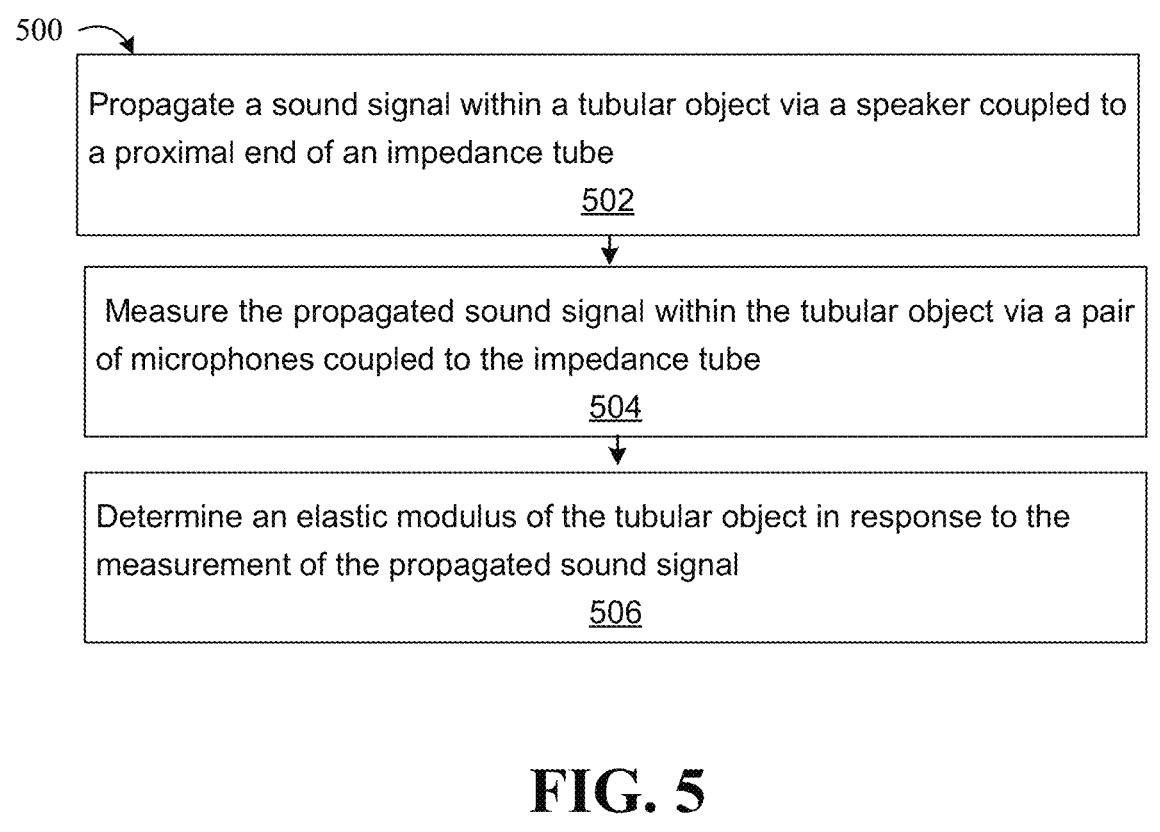

Propagate a sound signal within a tubular object via a speaker coupled to a proximal end of an impedance tube
502

Measure the propagated sound signal within the tubular object via a pair of microphones coupled to the impedance tube
504

Determine an elastic modulus of the tubular object in response to the measurement of the propagated sound signal
506

Figure 6:
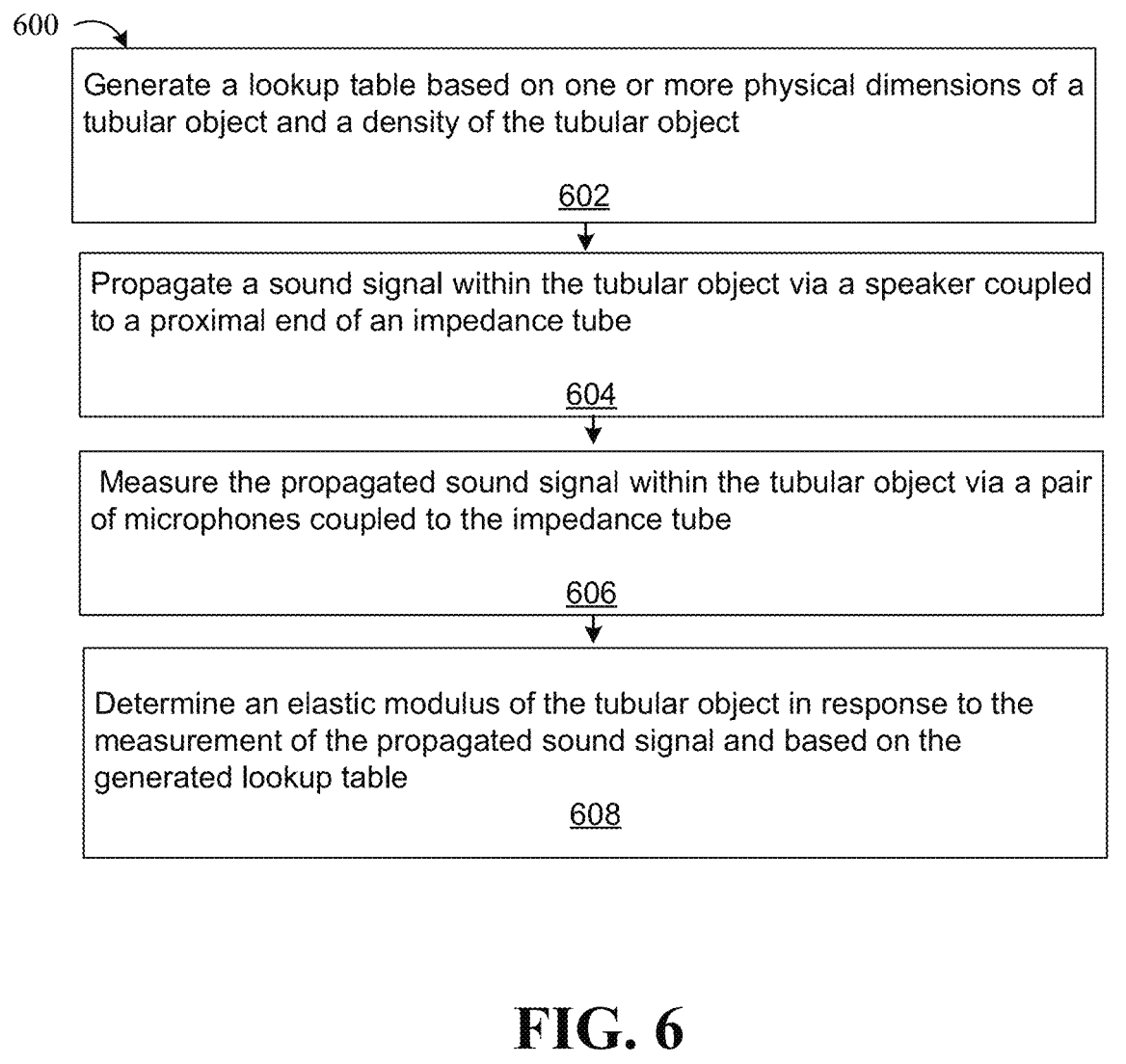

Generate a lookup table based on one or more physical dimensions of a tubular object and a density of the tubular object

602

Propagate a sound signal within the tubular object via a speaker coupled to a proximal end of an impedance tube

604

Measure the propagated sound signal within the tubular object via a pair of microphones coupled to the impedance tube

606

Determine an elastic modulus of the tubular object in response to the measurement of the propagated sound signal and based on the generated lookup table

CHARACTERIZATION OF ELASTIC MODULUS OF TUBULAR MATTER

TECHNICAL FIELD

Embodiments generally relate to measurement of an elastic modulus. More particularly, embodiments relate to measurement of an elastic modulus of tubular matter.

BACKGROUND

An elastic modulus is a measurement of a material's resistance to being deformed non-permanently when a stress is applied to the material. The elastic modulus of a material indicates whether it is a stiff material (e.g., with a higher elastic modulus). Such elastic modulus of materials are often measured using a planar piece of the material to be tested.

BRIEF DESCRIPTION OF THE DRAWINGS

Various examples will be described below by referencing the following drawings, in which:

FIG. 4 is an illustration of a look up table for an elastic modulus measuring system according to an example;

FIG. 5 is an illustration of a flowchart of an example method for measuring elastic modulus according to an example;

FIG. 6 is an illustration of a flowchart of a further example method for measuring elastic modulus according to an example;

DETAILED DESCRIPTION

As described above, elastic modulus of materials are often measured using a planar piece of the material to be tested. Currently, there is a lack of efficient and/or convenient methods of determining the elastic modulus of a hollow tube.

As will be discussed in greater detail below, some systems, apparatuses, and methods described herein address measuring elastic modulus usable with a tubular object. For example, sound signal is propagated within the tubular object via a speaker coupled to a proximal end of an impedance tube. The propagated sound signal is measured within the tubular object via a pair of microphones coupled to the impedance tube. An elastic modulus of the tubular object is determined in response to the measurement of the propagated sound signal.

In some implementations, some systems described herein includes an impedance tube that guides an acoustic wave (signal) emitted by a loudspeaker through a hollow cavity of the impedance tube and into a tubular material with an unknown elasticity modulus (E). Two microphones of the impedance tube are in communication with a data acquisition device that synchronizes the measurement of the signal and measures a signal (e.g., voltage and/or pressure) of a reflected wave. The tubular material is a hollow cylinder end that has a known length (L), inner diameter (Di), and outer diameter (Do). A cap is affixed to an open end of the tubular material, for example.

Figure 1:
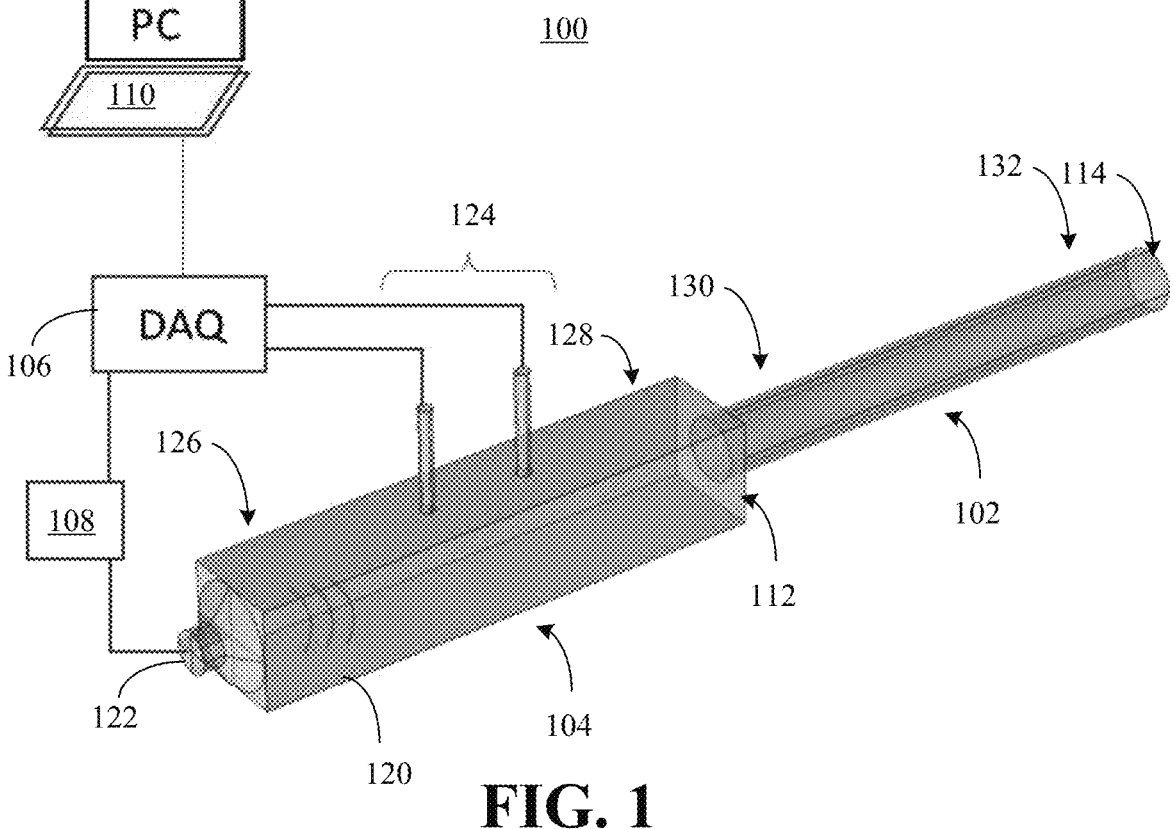
FIG. 1 is a schematic view illustrating an elastic modulus measuring system according to an example.

FIG. 1 is a schematic view illustrating an elastic modulus measuring system 100 according to an example. In the illustrated example, the elastic modulus measuring system 100 is usable with a tubular object 102 to measure the elastic modulus of the tubular object 102.

In some implementations, the elastic modulus measuring system 100 includes an impedance tube 104, a data acquisition device 106, a power amplifier 108, a computing device 110, an adaptor 112, and a cap 114.

In some examples, the impedance tube 104 includes a tube body 120, a speaker 122, and a pair of microphones 124. For example, the tube body 120 has a proximal end 126 and a distal end 128. In the illustrated example, the speaker 122 is coupled to the proximal end 126 and the pair of microphones 124 is coupled to the tube body 120.

In some implementations, the data acquisition device 106 is coupled to the pair of microphones 124 to synchronize measurement of a signal generated by the speaker 122. In the illustrated example, the power amplifier 108 is coupled to the speaker 122 and to the data acquisition device 106 to regulate power to the speaker 122.

In some examples, the computing device 110 is coupled to the data acquisition device 106 to receive data, make calculation based on the received data, and/or to control the operation of elastic modulus measuring system 100. the techniques described herein are applicable to any type of electronic device in a variety of configurations and form factors for performing the functions described herein. For example, the computing device 110 is implementable as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, the like, and/or any other computing device configured to perform the functions described herein.

As will be described in greater detail below, in some implementations, the adaptor 112 couples the impedance tube 104 to a first end 130 of the tubular object 102. Additionally, or alternatively, the cap 114 couples to a second end 132 of the tubular object 102 to cover an opening in the second end 132 of the tubular object 102.

Additional and/or alternative operations for the elastic modulus measuring system 100 are described in greater detail below in the description of FIG. 2.

Figure 2:
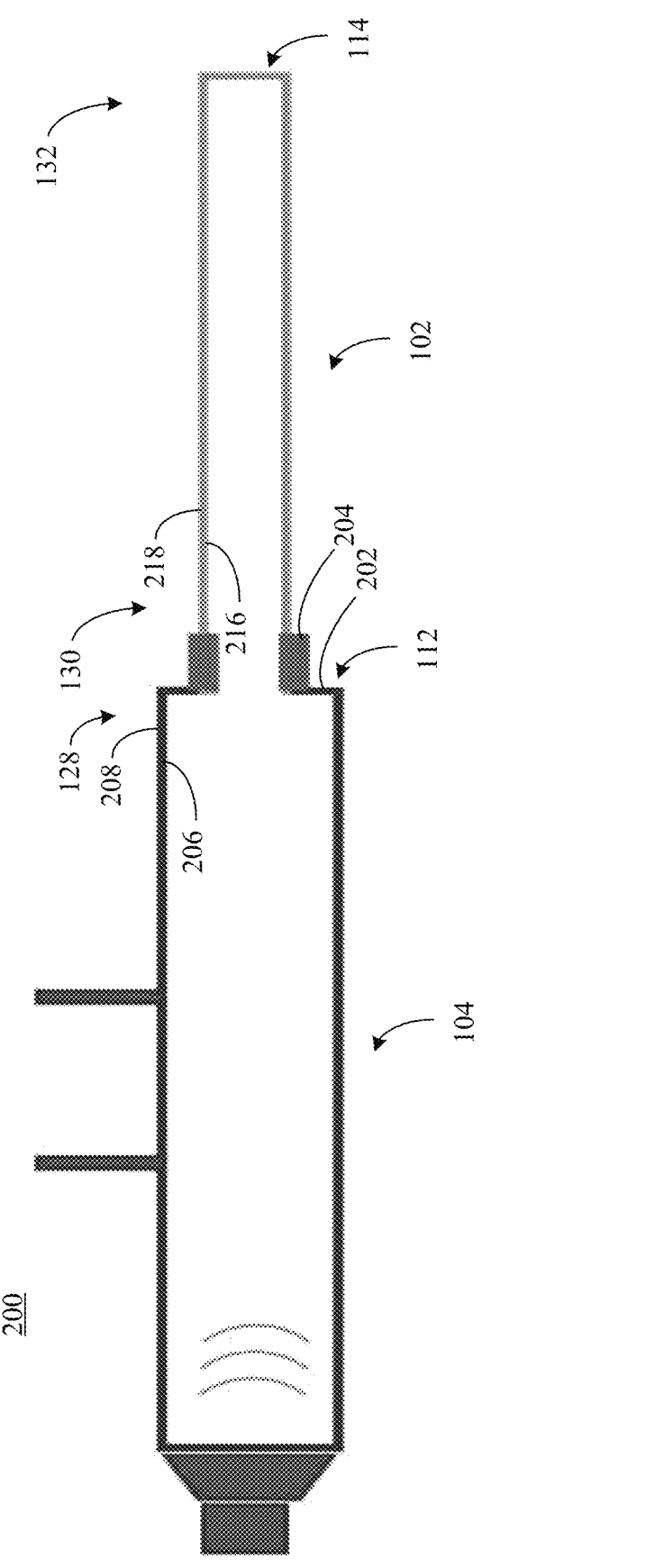
FIG. 2 is a cross sectional side view diagram illustrating another elastic modulus measuring system according to an example.

FIG. 2 is a cross sectional side view diagram illustrating another elastic modulus measuring system 200 according to an example. As discussed above, in some implementations, the adaptor 112 couples the impedance tube 104 to the first end 130 of the tubular object 102. Additionally, or alternatively, the cap 114 couples to the second end 132 of the tubular object 102 to cover an opening in the second end 132 of the tubular object 102.

In the illustrated example, the adaptor includes 112 a first coupling portion 202 and a second coupling portion 204. For example, the first coupling portion 202 is to couple to the distal end 128 of the tube body 120 of the impedance tube

104. Additionally, or alternatively, the second coupling portion 204 is to couple to the first end 130 of the tubular object 102.

In some examples, the first coupling portion 202 is fixedly coupled to the distal end 128 of the impedance tube 104. In some implementations, the first coupling portion 202 is to removably couple to the distal end 128. In some examples, the first coupling portion 202 is to removably couple to an interior surface 206 of the distal end 128, an exterior surface 208 of the distal end 128, and/or to both the interior surface 206 and the exterior surface 208 of the distal end 128.

In some implementations, the second coupling portion 204 is to removably couple to the first end 130 of the tubular object 102. In some examples, the second coupling portion 204 is to removably couple to an internal surface 216 of the first end 130 of the tubular object 102, an outer surface 218 of the first end 130 of the tubular object 102, and/or to both the internal surface 216 and the outer surface 218 of the first end 130 of the tubular object 102.

In some examples, the cap 114 is to removably couple to the second end 132 of the tubular object 102. In some examples, the cap 114 is to removably couple to an internal surface 216 of the second end 132 of the tubular object 102, an outer surface 218 of the second end 132 of the tubular object 102, and/or to both the internal surface 216 and the outer surface 218 of the second end 132 of the tubular object 102.

Figure 3:
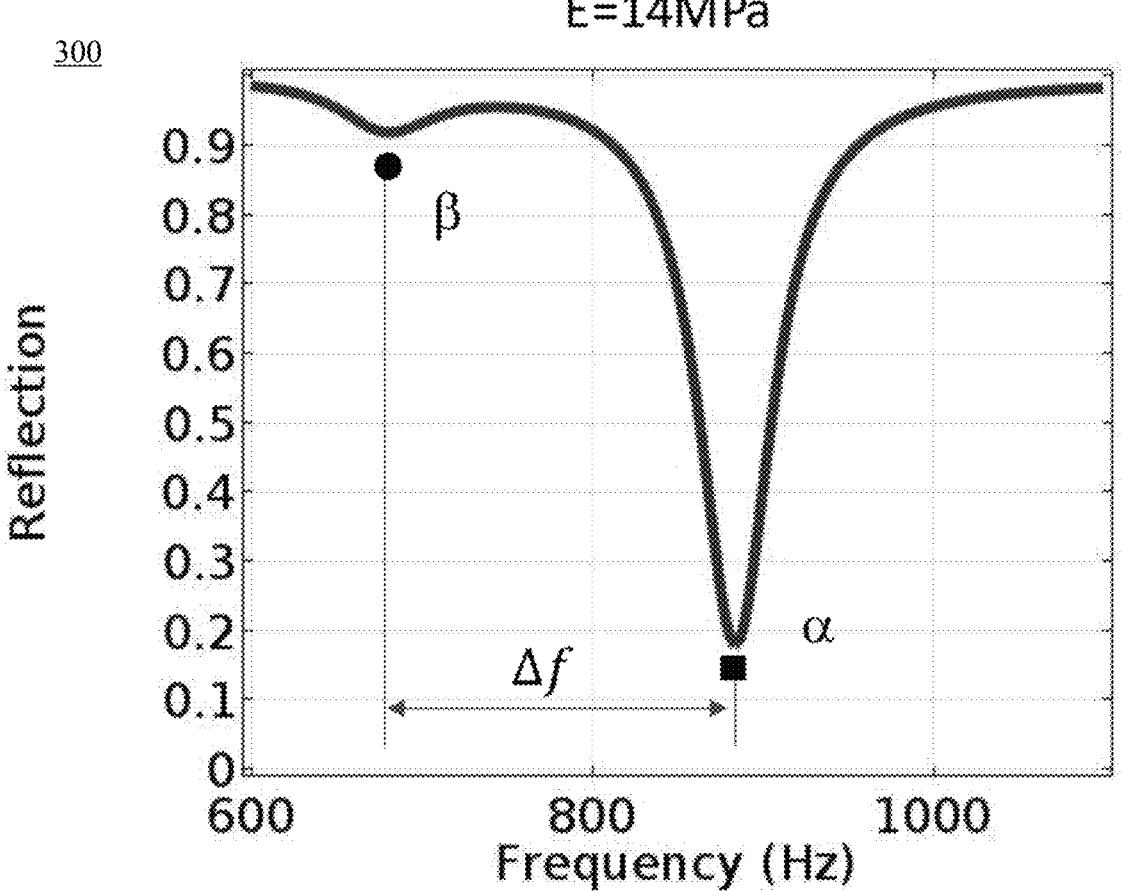
FIG. 3 is an illustration of a graph of reflection and frequency readings from an elastic modulus measuring system according to an example.

FIG. 3 is an illustration of a graph 300 of reflection and frequency readings from an elastic modulus measuring system according to an example. In the illustrated example, graph 300 shows the signal measured by the two-microphone setup illustrated in FIGS. 1 and 2. For an example material that has an elastic modulus of 14 MPa, an inner diameter of 7 mm, an outer diameter of 8 mm, and a length of 90 mm, there will be at least two reflected signals. The greater peak ($\alpha$) corresponds to the unattenuated acoustic wave ($f_{QWR}$) while the lower frequency peak ($\beta$) corresponds to the structural mode ($f_Q=1$). This difference in frequency between greater peak ($\alpha$) and the lower frequency peak ($\beta$) is denoted by ($\Delta f$) and can be analyzed using a lookup table like that shown in FIG. 4, as will be described in greater detail below.

FIG. 4 is an illustration of a look up table 400 for an elastic modulus measuring system according to an example. In the illustrated example, both the unattenuated acoustic wave ($f_{QWR}$) and the structural mode ($f_Q=1$) peaks demonstrate a change in frequency when the elastic modulus of the tube changes. Although the $f_{QWR}$ alone could be used to determine the elastic modulus of the material in some instances, the difference ($\Delta f$) has a greater wavelength dependence and typically allows a more accurate determination of an elasticity modulus (E).

Also shown in FIG. 4, other structural mode peaks, $f_Q=2$, 3, etc. can be present.

Further, calculations 402 shown in FIG. 4 may be performed. As illustrated, a number of inputs 404 are ascertained from automated and/or manual measurements via an experimental setup, including the dimensions of the tube, the density of the tube, and, to a lesser extent, the tube's Poisson ratio.

The equations shown in the calculations 402 of FIG. 4 are used to create the lookup table 400, for example.

In operation, some systems, apparatuses, and methods described herein measure the dimensions, density, and Poisson ratio (data) of a tubular material of unknown elastic modulus. Such data may be used along with the calculations 402 to create the lookup table 400. A system (e.g., like as shown in FIGS. 1 and/or 2) may provide outputs of raw data for fQWR and fQ=1 (or more). The constructed lookup table 400 may then be utilized to determine the elastic modulus of the tubular material.

FIG. 5 shows an example method 500 for measuring elastic modulus according to an example. The method 500 may generally be implemented in an apparatus, such as, for example, the system 100 (FIG. 1) and/or the system 200 (FIG. 2), already discussed.

Illustrated processing block 502 provides for propagating a sound signal within a tubular object. For example, a sound signal may be propagated within the tubular object via a speaker coupled to a proximal end of an impedance tube.

In some implementations, the propagation of the sound signal within the tubular object is performed via the impedance tube being coupled to the tubular object.

In some examples, the propagation of the sound signal within the tubular object is performed via a second end of the tubular object being coupled to a cap to cover an opening in the second end of the tubular object.

In some implementations, the propagation of the sound signal within the tubular object is performed via a first end of the tubular object being coupled to the impedance tube and a second end of the tubular object being coupled to a cap to cover an opening in the second end of the tubular object.

Illustrated processing block 504 provides for measuring the propagated sound signal within the tubular object. For example, the propagated sound signal may be measured within the tubular object via a pair of microphones coupled to the impedance tube.

Illustrated processing block 506 provides for determining an elastic modulus of the tubular object. For example, an elastic modulus of the tubular object may be determined in response to the measurement of the propagated sound signal.

Additional and/or alternative operations for method 500 are described in greater detail below in the description of FIG. 6.

FIG. 6 is a flowchart of an example of another method 600 for measuring elastic modulus according to an example. The method 600 may generally be implemented in an apparatus, such as, for example, the elastic modulus measuring system 100 (FIG. 1) and/or the elastic modulus measuring system 200 (FIG. 2), already discussed.

In an example, the method 600 (as well as method 500 (FIG. 5) may be implemented in computer readable instructions (e.g., software), configurable computer readable instructions (e.g., firmware), fixed-functionality computer readable instructions (e.g., hardware), etc., or any combination thereof.

In some examples, it will be appreciated that some or all of the operations in method 600 (as well as method 500 (FIG. 5) may be performed at least in part by cloud processing.

It will be appreciated that some or all of the operations in method 600 (as well as method 500 (FIG. 5) are described using a "pull" architecture (e.g., polling for new information followed by a corresponding response) may instead be implemented using a "push" architecture (e.g., sending such information when there is new information to report), and vice versa.

Illustrated processing block 602 provides for generating a lookup table. For example, a lookup table may be generated based on one or more physical dimensions of a tubular object and a density of the tubular object.

Illustrated processing block 604 provides for propagating a sound signal within the tubular object. For example, a sound signal may be propagated within the tubular object via a speaker coupled to a proximal end of an impedance tube.

Illustrated processing block 606 provides for measuring the propagated sound signal. For example, Measure the propagated sound signal within the tubular object via a pair of microphones coupled to the impedance tube Illustrated processing block 608 provides for determining an elastic modulus of the tubular object. For example, an elastic modulus of the tubular object may be determined in response to the measurement of the propagated sound signal and based on the generated lookup table.

Figure 7:
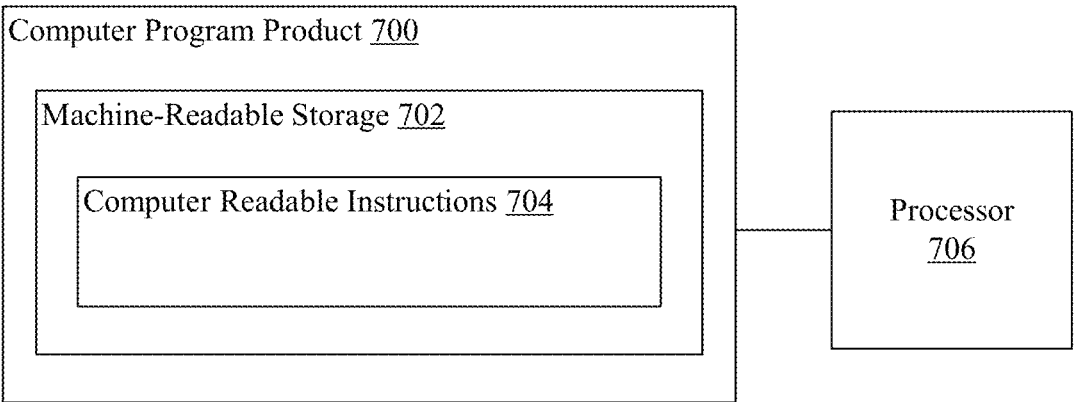
FIG. 7 is a block diagram illustrating a computer program product according to an example.

FIG. 7 illustrates a block diagram of an example computer program product 700. In some examples, as shown in FIG. 7, computer program product 700 includes a machine-readable storage 702 that may also include computer readable instructions 704. In some implementations, the machine-readable storage 702 may be implemented as a non-transitory machine-readable storage. In some implementations the computer readable instructions 704, which may be implemented as software, for example. In an example, the computer readable instructions 704, when executed by a processor 706, implement one or more aspects of the method 500 (FIG. 5), the method 600 (FIG. 6), the elastic modulus measuring system 100 (FIG. elastic modulus measuring 2), already discussed.

Figure 8:
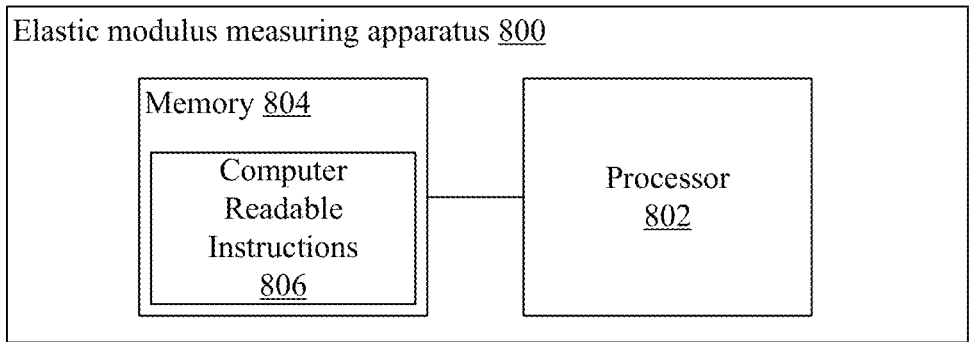
FIG. 8 is a block diagram illustrating an example fluid delivery apparatus according to an example.

FIG. 8 shows an illustrative example of an elastic modulus measuring apparatus 800. In the illustrated example, the elastic modulus measuring apparatus 800 may include a processor 802 and a memory 804 communicatively coupled to the processor 802. The memory 804 may include computer readable instructions 806, which may be implemented as software, for example. In an example, the computer readable instructions 806, when executed by the processor 802, implement one or more aspects of the method 500 (FIG. 5), the method 600 (FIG. 6), the elastic modulus measuring system 100 (FIG. 1), and/or the elastic modulus measuring system 200 (FIG. 2), already discussed.

In some implementations, the processor 802 may include a general purpose controller, a special purpose controller, a storage controller, a storage manager, a memory controller, a micro-controller, a general purpose processor, a special purpose processor, a central processor unit (CPU), the like, and/or combinations thereof.

Further, implementations may include distributed processing, component/object distributed processing, parallel processing, the like, and/or combinations thereof. For example, virtual computer system processing may implement one or more of the methods or functionalities as described herein, and the processor 802 described herein may be used to support such virtual processing.

In some examples, the memory 804 is an example of a computer-readable storage medium. For example, memory 804 may be any memory which is accessible to the processor 802, including, but not limited to RAM memory, registers, and register files, the like, and/or combinations thereof. References to "computer memory" or "memory" should be interpreted as possibly being multiple memories. The memory may for instance be multiple memories within the same computer system. The memory may also be multiple memories distributed amongst multiple computer systems or computing devices.

Figure 9:
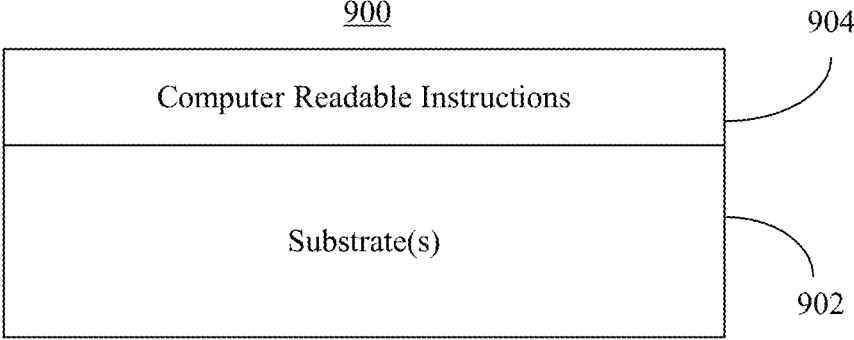
FIG. 9 is a block diagram illustrating a hardware apparatus including a semiconductor package according to an example.

FIG. 9 shows an illustrative semiconductor apparatus 900 (e.g., chip and/or package). The illustrated apparatus 900 includes one or more substrates 902 (e.g., silicon, sapphire, or gallium arsenide) and computer readable instructions 904 (such as, configurable computer readable instructions (e.g., firmware) and/or fixed-functionality computer readable instructions (e.g., hardware)) coupled to the substrate(s) 902. In an example, the computer readable instructions 904 implement one or more aspects of the method 500 (FIG. 5), the method 600 (FIG. 6), the elastic modulus measuring system 100 (FIG. 1), and/or the elastic modulus measuring system 200 (FIG. 2), already discussed.

In some implementations, computer readable instructions 904 may include transistor array and/or other integrated circuit/IC components. For example, configurable firmware logic and/or fixed-functionality hardware logic implementations of the computer readable instructions 904 may include configurable computer readable instructions such as, for example, programmable logic arrays (PLAs), field programmable gate arrays (FPGAs), complex programmable logic devices (CPLDs), or fixed-functionality computer readable instructions (e.g., hardware) using circuit technology such as, for example, application specific integrated circuit (ASIC), complementary metal oxide semiconductor (CMOS) or transistor-transistor logic (TTL) technology, the like, and/or combinations thereof.

All definitions, as defined and used herein, should be understood to control over dictionary definitions, definitions in documents incorporated by reference, and/or ordinary meanings of the defined terms.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Although a number of illustrative examples are described herein, it should be understood that numerous other modifications and examples can be devised by those skilled in the art that will fall within the spirit and scope of the principles of the foregoing disclosure. More particularly, reasonable variations and modifications are possible in the component parts and/or arrangements of the subject combination arrangement within the scope of the foregoing disclosure, the drawings and the appended claims without departing from the spirit of the foregoing disclosure. In addition to variations and modifications in the component parts and/or arrangements, alternative uses will also be apparent to those skilled in the art. The examples may be combined to form additional examples.

We claim:

1. An elastic modulus measuring system usable with a tubular object, the elastic modulus measuring system comprising:

an impedance tube comprising:
   a tube body having a proximal end and a distal end;
an adaptor comprising:
   a first coupling portion to couple to the distal end, and
      a second coupling portion to couple to a first end of the tubular object; and a processor communicatively coupled to a memory, the memory including computer readable instructions, which when executed by the processor perform operations to:

propagate a sound signal within the tubular object via a speaker coupled to a proximal end of the impedance tube;

measure the propagated sound signal within the tubular object via a pair of microphones coupled to the impedance tube; and determine an elastic modulus of the tubular object based on the measurement of the propagated sound signal.

2. The elastic modulus measuring system of claim 1, wherein the first coupling portion is fixedly coupled to the distal end.

3. The elastic modulus measuring system of claim 1, wherein the first coupling portion is removably couplable to the distal end.

4. The elastic modulus measuring system of claim 3, wherein the first coupling portion is removably couplable to one or more of an interior surface of the distal end and an exterior surface of the distal end.

5. The elastic modulus measuring system of claim 1, wherein the second coupling portion is removably couplable to one or more of an internal surface of the first end of the tubular object and an outer surface of the first end of the tubular object.

6. The elastic modulus measuring system of claim 1, the elastic modulus measuring system further comprising:

a cap to couple to a second end of the tubular object and to cover an opening in the second end of the tubular object.

7. The elastic modulus measuring system of claim 1, the impedance tube further comprising:

a speaker coupled to the proximal end; and a pair of microphones coupled to the tube body.

8. An elastic modulus measuring system usable with a tubular object, the elastic modulus measuring system comprising:

an impedance tube comprising:

a tube body having a proximal end and a distal end, a speaker coupled to the proximal end, and a pair of microphones coupled to the tube body;

a data acquisition device coupled to the pair of microphones to synchronize measurement of a signal generated by the speaker;

an adaptor comprising:

a first coupling portion to couple to the distal end, and a second coupling portion to couple to a first end of the tubular object; and a processor communicatively coupled to a memory, the memory including computer readable instructions, which when executed by the processor perform operations to:

propagate a sound signal within the tubular object via the speaker coupled to the proximal end of the impedance tube;

measure the propagated sound signal within the tubular object via the pair of microphones coupled to the tube body; and determine an elastic modulus of the tubular object based on the measurement of the propagated sound signal.

9. The elastic modulus measuring system of claim 8, wherein the first coupling portion is fixedly coupled to the distal end.

10. The elastic modulus measuring system of claim 8, wherein the first coupling portion is removably couplable to the distal end.

11. The elastic modulus measuring system of claim 10, wherein the first coupling portion is removably couplable to one or more of an interior surface of the distal end and an exterior surface of the distal end.

12. The elastic modulus measuring system of claim 8, wherein the second coupling portion is removably couplable to one or more of an internal surface of the first end of the tubular object and an outer surface of the first end of the tubular object.

13. The elastic modulus measuring system of claim 8, the elastic modulus measuring system further comprising:

a cap to couple to a second end of the tubular object and to cover an opening in the second end of the tubular object.

14. A method of measuring elastic modulus usable with a tubular object, the method comprising:

propagating a sound signal within the tubular object via a speaker coupled to a proximal end of an impedance tube;

measuring the propagated sound signal within the tubular object via a pair of microphones coupled to the impedance tube; and determining an elastic modulus of the tubular object in response to the measurement of the propagated sound signal.

15. The method of measuring elastic modulus of claim 14, further comprising:

generating a lookup table based on one or more physical dimensions of the tubular object and a density of the tubular object.

16. The method of measuring elastic modulus of claim 15, wherein the determination of the elastic modulus of the tubular object is based on the generated lookup table.

17. The method of measuring elastic modulus of claim 14, wherein the propagation of the sound signal within the tubular object is performed via the impedance tube being coupled to the tubular object.

18. The method of measuring elastic modulus of claim 14, wherein the propagation of the sound signal within the tubular object is performed via a second end of the tubular object being coupled to a cap to cover an opening in the second end of the tubular object.

19. The method of measuring elastic modulus of claim 14, wherein the propagation of the sound signal within the tubular object is performed via a first end of the tubular object being coupled to the impedance tube and a second end of the tubular object being coupled to a cap to cover an opening in the second end of the tubular object.

* * * * *